United States Patent [19]
Jensen et al.

[11] Patent Number: 5,704,207
[45] Date of Patent: Jan. 6, 1998

[54] FLOW CONTROL APPARATUS FOR GAS TURBINE ENGINE INSTALLATION PRESSURE RELIEF DOORS

[75] Inventors: Daniel T. Jensen, Mountlake Terrace; Ronald L. Balzer, Bothell, both of Wash.

[73] Assignee: The Boeing Company, Seattle, Wash.

[21] Appl. No.: 648,992

[22] Filed: May 17, 1996

Related U.S. Application Data

[62] Division of Ser. No. 383,243, Feb. 3, 1995.

[51] Int. Cl.$^6$ ........................................... F02C 7/00
[52] U.S. Cl. ................. 60/39.091; 60/39.33; 244/129.4
[58] Field of Search ....................... 60/39.07, 39.091, 60/39.31, 39.33, 39.83, 223, 226.1; 244/54, 110 D, 113, 129.4; 415/201

[56] References Cited

U.S. PATENT DOCUMENTS

| | | | |
|---|---|---|---|
| 2,698,149 | 12/1954 | Greenwood et al. | 244/113 |
| 3,571,977 | 3/1971 | Abeel | 49/379 |
| 4,232,513 | 11/1980 | Pearson et al. | |
| 4,463,552 | 8/1984 | Monhardt et al. | |
| 4,546,605 | 10/1985 | Mortimer et al. | |
| 4,739,964 | 4/1988 | Hutt | |
| 4,825,644 | 5/1989 | Bubello et al. | |
| 5,038,560 | 8/1991 | Seed | |
| 5,054,281 | 10/1991 | Mutch | |
| 5,213,286 | 5/1993 | Elliot et al. | 244/129.4 |
| 5,351,476 | 10/1994 | Laborie et al. | |

*Primary Examiner*—Louis J. Casaregola
*Attorney, Agent, or Firm*—Christensen O'Connor Johnson & Kindness PLLC

[57] ABSTRACT

An improved pressure relief system for a turbine engine (10). The pressure relief system includes a pressure relief door (12) attached to the engine shroud (16) at its forward edge. The aft edge of the door (12) is free to pivot onward in the occurrence of a bleed duct failure. The door (12) is mounted within a cutout (26) in the engine shroud (16). The cutout (26) is sized so that the width of the forward edge of the cutout is greater than the width of the aft edge of the cutout. Opposing walls (42) on either side of the door (12) extend from the forward edge of the door at least partially to the aft edge of the door. The walls (42) extend inward approximately normal to the surface of the door (12). The walls (42) prevent hot engine gases (36) from flowing out of the sides of the cutout. Preventing hot engine gases (36) from flowing out the sides of the cutout helps to alter the air flow around the door (12) to obtain greater mixing of cool bypass air with the hot engine gases. The resulting cooler air flow decreases engine shroud (16) temperatures aft of the pressure relief door (12). The decreased temperatures on the engine shroud (16) during a bleed duct failure help to eliminate the structural requirements for high temperature materials or insulating blankets.

4 Claims, 5 Drawing Sheets

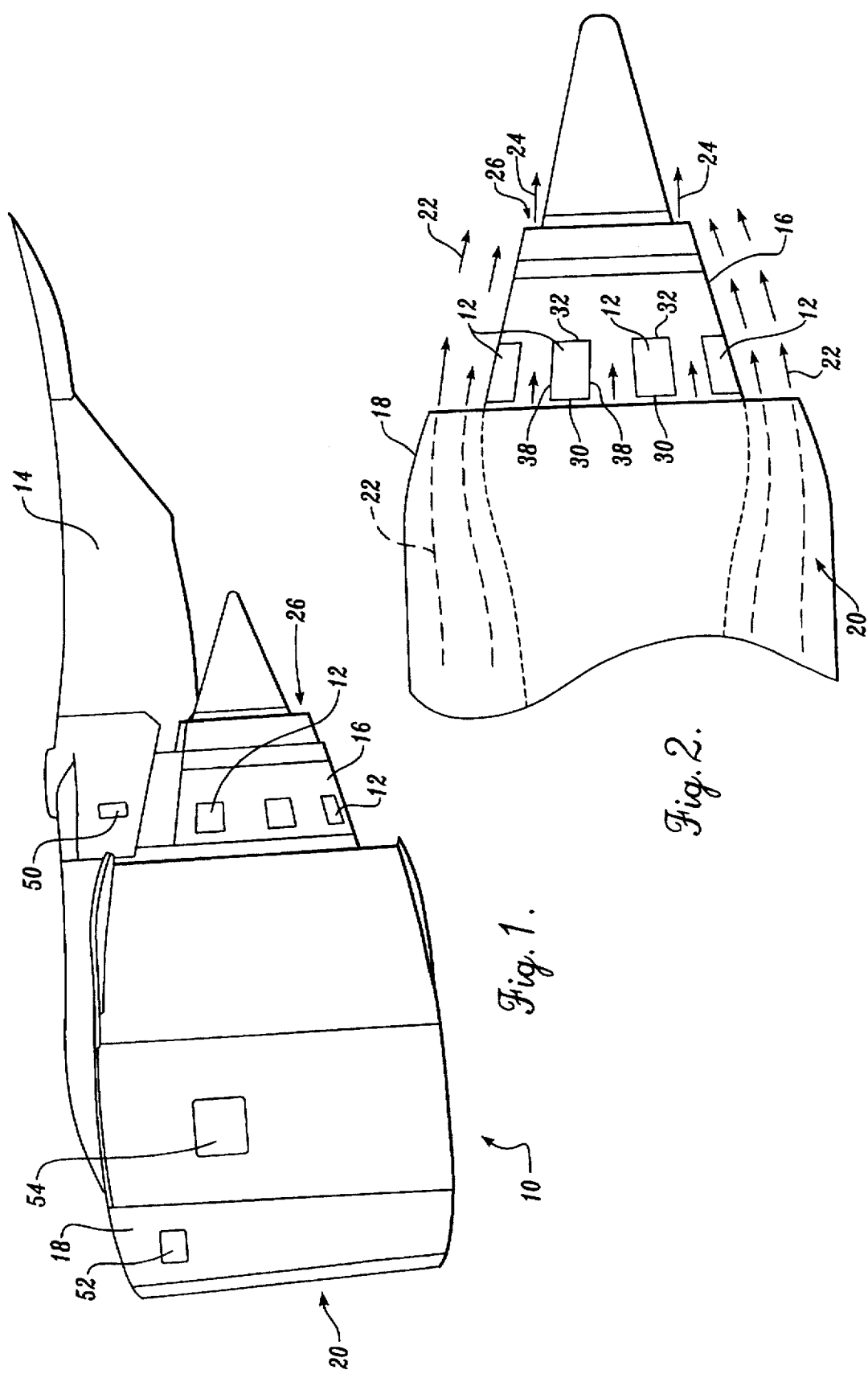

FLOW CONTROL APPARATUS FOR GAS TURBINE ENGINE INSTALLATION PRESSURE RELIEF DOORS

This is a divisional of the prior application Ser. No. 08/383,243, filed Feb. 3, 1995, the benefit of the filing date of which are hereby claimed under 35 U.S.C. § 120.

FIELD OF THE INVENTION

The present invention relates to pressure relief doors on gas turbine engine installations, and more specifically to a pressure relief system for improving flow around and through the pressure relief doors to prevent overheating of structural components aft of the door.

BACKGROUND OF THE INVENTION

Gas turbine engines are widely used in commercial aircraft throughout the world. These engines include a forward stage of fan blades that are rotatably mounted to the front of a turbine engine and are driven at high speeds by the engine. The turbine engine is generally surrounded by an aerodynamically shaped engine shroud that provides a protective cover for the engine and also increases aerodynamic efficiency. In order to further increase damage tolerance and aerodynamic efficiency, the fan blades, engine and engine shroud may be surrounded by a ducted nacelle. The inner diameter of the nacelle is sized to encompass and form a duct around the fan blades and engine shroud. The nacelle forces the high velocity air stream produced by the fan blades to flow between the inner surface of the nacelle and the outer surface of the engine shroud. The flow of air produced by the fan blades is generally referred to as the fan or bypass air flow and contributes to the propulsive force produced by the engine.

The compression and turbine stages of the turbine engine also produce a high velocity air flow that contributes to overall engine propulsion. The high velocity air flow produced by the turbine engine flows out the aft end of the engine rearward of the nacelle. Unlike the bypass air flow, however, the flow produced by the turbine engine is at a mix of air and combusted fuel byproducts at a highly elevated temperature.

During an engine failure, such as a bleed duct failure, explosion, or overpressurization failure, it is possible for the high temperature flow of gases within the turbine engine to vent into the space between the engine and the engine shroud or other compartment in the installation. During a bleed duct or other failure, a significant volume of high-temperature air flow into the space between the engine and engine shroud or other installation. This flow of gases pressurizes and heats the space between the turbine engine and engine shroud. If left to its own course, the high temperatures and pressures caused by a bleed duct or other failure can cause a structural failure of the engine shroud or other installation.

Federal aircraft regulations, FAR 25.1103, requires that engine installations safely withstand the effects of an engine bleed duct failure. In order to comply with FAR 25.1103 and prevent failure of the engine structure during a bleed duct or other failure, it is common to locate a series of pressure relief doors around the exterior of the engine shroud aft of the nacelle, on the inlet of the nacelle and on the engine pylon. The pressure relief or "blowout doors" are rectangularly shaped to fit rectangularly shaped contents. The pressure relief doors are mechanically mounted to the shroud or other structure so that they automatically open in case of excessive compartment pressurization. During a bleed duct or other failure, the pressure relief doors open and allow the high temperature gases to flow out of the shroud thus preventing overpressurization and subsequent structural failure.

Although the pressure relief doors prevent structural failures due to overpressurization, the structure downstream of the doors must still be able to withstand contact with the high temperature gases escaping through the pressure relief doors. After hot engine gases escape through the pressure relief doors, they flow rearward along the exterior surface of the structure. The hot engine gases can remain in contact with the exterior surface of the structure for a sufficient amount of time to elevate the temperature of the surrounding structure. Under some conditions, it is possible for the surrounding structure to be elevated to a sufficiently high temperature to cause structural failure due to overheating.

To prevent such structural failures, the structure aft of the pressure relief doors has traditionally been protected by thermal insulating blankets. Alternatively, the structure has been fabricated of a material capable of withstanding the high temperatures produced by the escaping engine gases, for example, titanium. The use of either thermal insulating blankets or high temperature materials present a number of disadvantages. Using insulating blankets complicates the fabrication and maintenance of the engine installation and adds to the overall cost and weight. The use of titanium and other high temperature materials can also add weight to the overstructure and also add to fabrication complexity, difficulty, and cost. In addition, coefficient of expansion differences between a titanium or steel structure and the surrounding aluminum or composite structure can add to the complexity of the overall installation.

As seen from the above discussion, there exists a need in the aircraft industry for a pressure relief system to safely address the problems created by an engine bleed duct or other failure while reducing the disadvantages of prior art solutions. The present invention is directed to such a system.

SUMMARY OF THE INVENTION

The present invention is an improved pressure relief system for a ducted fan or other type of gas turbine engine. The pressure relief system includes a cutout in the engine structure through which gases from the engine can escape the engine shroud in the event of a bleed duct or other failure. In one embodiment of the invention, the forward edge of the cutout is wider than the aft edge of the cutout, preferably defining a trapezoidal shape. The pressure relief system also includes a door having opposite sides and forward and aft edges. The forward edge of the door preferably is pivotally coupled to the engine shroud upstream along the directional movement of the bypass air flow.

In another embodiment of the invention, the door includes opposing walls located on the sides of the door. The walls extend inward approximately normal to the surface of the door into the cutout. The walls also extend at least partially from the forward edge of the door to the aft edge of the door.

In accordance with other features of the invention, the width of the forward edge of the door is wider than the width of the aft edge of the door. Preferably, like the cutouts, the pressure relief doors have a rectangular shape.

The present invention's use of trapezoidal cutouts in the shroud and/or walls on the sides of the pressure relief doors alters the flow of the cooler bypass air around the pressure relief door during engine operation. Both the trapezoidal cutouts and walls allow the cooler bypass or freestream air flow to mix more readily with the hot engine gases as compared to similarly sized rectangular cutouts and pressure relief doors. The result is that hot engine gases exiting pressure relief doors according to the present invention do not stay in contact with the engine shroud for as long a period of time as with prior pressure relief doors. Therefore, pressure relief doors formed in accordance with the present invention decreases the surface temperatures on the structure of the engine shroud aft of the pressure relief door when compared to prior pressure relief doors.

The present invention's ability to decrease engine structure temperatures aft of the pressure relief door creates a number of advantages. The reduced temperatures allow the structure to be fabricated of less expensive materials such as aluminum. In addition, the lower temperatures produced by the present invention reduce and/or eliminate the need for insulating blankets. The present invention produces these advantages while meeting the requirements of Federal regulation FAR 25.1103.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein:

FIG. 1 is a side elevation view of a ducted fan turbine engine assembly including mounting pylon or strut;

FIG. 2 is an enlarged view of the aft end of the nacelle and shroud of the engine shown in FIG. 1 emphasizing the engine's pressure relief doors;

DETAILED DESCRIPTION OF THE PREFERRED EMBODIMENT

Figure 3:
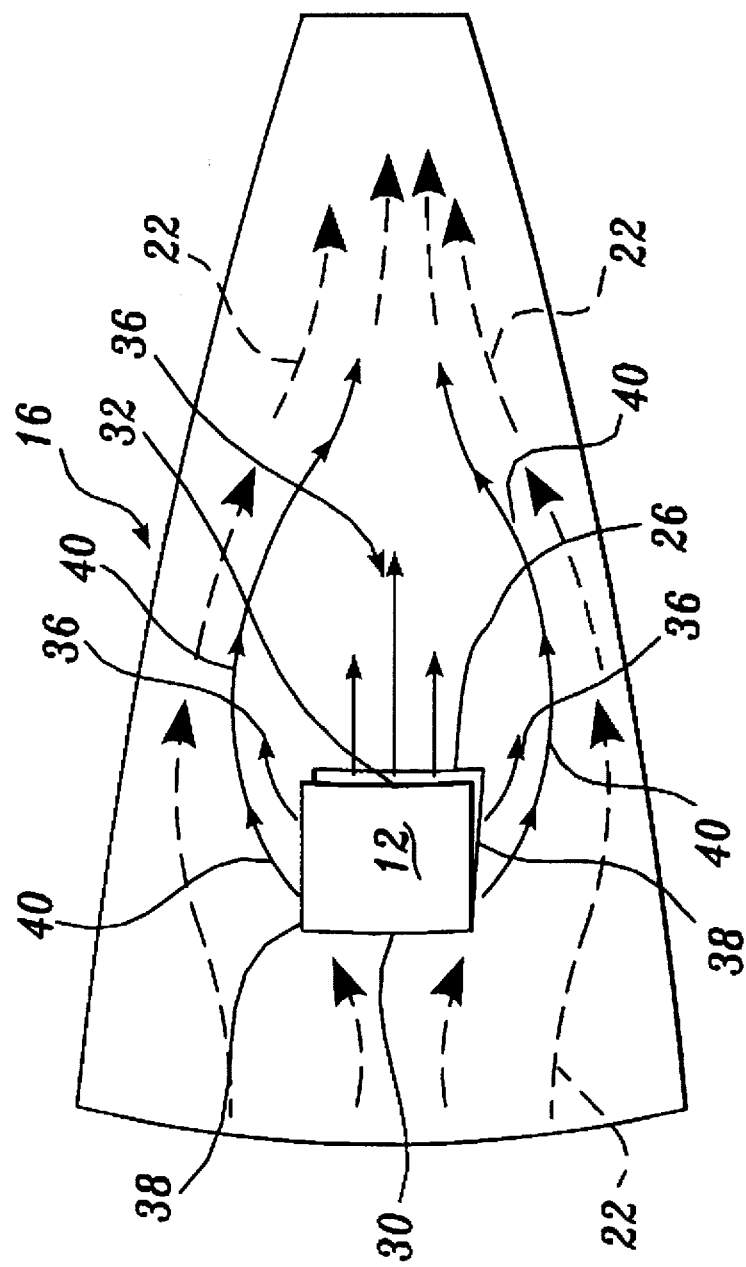
FIG. 3 is a schematic view of the air flow over the portion of the engine shroud surrounding an open prior art pressure relief door.

FIG. 1 illustrates a ducted fan turbine engine assembly 10 including pressure relief doors 12 according to the present invention. The engine assembly 10 is mounted to the lower surface of an aircraft's wing (not shown) through the use of an engine pylon 14 in a manner well known in the art. The engine assembly 10 includes a turbine engine that is enclosed by an engine shroud 16. The engine assembly 10 also includes a stage of fan blades (not shown) that are rotatably mounted to the front end of the turbine engine and are driven by the engine in a manner well known in the art. The stage of fan blades and the forward section of the engine and engine shroud 16 are surrounded by a ducted engine nacelle 18.

The nacelle 18 is sized so that its inner diameter is sufficiently large to surround the stage of fan blades in order to form a duct around the fan blades. The nacelle's ducting of the fan blades increases the efficiency of the engine assembly 10 and also increases damage tolerance by helping to protect the fan blades and engine from damage due to contact with foreign objects. Air enters the engine and stage of fan blades through the forward open inlet 20 of the nacelle 18. During operation, the air entering the inlet 20 is forced rearward at high speeds by the high-speed rotating fan blades.

A portion of the high speed air stream produced by the stage of fan blades enters the compression stage of the turbine engine. Another portion of the high speed air flow produced by the stage of fan blades flows between the interior surface of the nacelle 18 and the exterior surface of the engine shroud 16. The high speed flow of air moving between the interior surface of the nacelle 18 and the exterior surface of the engine 16 is generally referred to as the bypass air flow 22 because it bypasses the turbine engine. The bypass air flow 22 flows through the duct produced by the engine nacelle 18 and engine shroud 16 and exits out the aft end of the engine shroud as illustrated in FIG. 2. Because the bypass air flow 22 does not enter the turbine engine, it remains at a relatively cool temperature as compared to the high temperature exhaust gas flow 24 exiting the turbine engine.

The portion of the high speed air stream produced by the stage of fan blades entering the engine is compressed, mixed with fuel and ignited within the engine to produce thrust. The resulting high temperature mixture of gases exits the aft end of the engine through outlet 26.

As described in the background section, during an engine bleed duct or other failure the high temperature and pressure gas flow produced by the compression stage of the engine can enter the compartment between the engine shroud 16 and the engine. As required by federal aircraft regulations, FAR 25.1103, in order to ensure that the engine assembly 10 safely withstands an engine bleed duct failure, a plurality of pressure relief doors 12 are located around the circumference of the aft section of the engine shroud 16 as best seen in FIGS. 1 and 2. It is advantageous to locate the pressure relief doors 12 aft of the aft edge of the nacelle 18 to ensure that the high temperature gases exiting the pressure relief doors do not damage the nacelle.

The forward edge 30 (FIG. 3) of each pressure relief door 12 is hinged to the engine shroud 16 at or near the forward edge of a cutout 26 in the engine shroud. The aft edge 32 of each pressure relief door 12 is releasably attached to the engine shroud 16 by a release latch mechanism (not shown). The release latch mechanism is configured to release when the pressure within the engine shroud 16 reaches a predetermined pressure after a bleed duct or other failure. When pressurization occurs, the release latch releases, allowing the aft edge 32 of the pressure relief door 12 to pivot open, as illustrated in FIG. 3. As the pressure relief door 12 opens, the high pressure, hot engine gases 36 vent out both the sides 38 and aft edge 32 of the pressure relief door and cutout 26. As the hot gases 36 vent out of the pressure relief door 12 and cutout 26, they combine and mix with the cool bypass air flow 22 provided by the stage of fan blades.

In prior pressure relief door 12 and cutout 26 configurations, a large volume of the hot engine gases 36 flowed out from underneath the sides 38 of the door and a large volume of hot engine gases flowed out from under the aft edge 32 of the door. As schematically illustrated in FIG. 3, the hot engine gases 36 spread and remain in contact with the exterior surface of the engine shroud 16, forming a hot pocket of engine gases. The hot pocket of engine gases as outlined by arrows 40 (FIG. 3) prevented the cool bypass air flow 22 from quickly mixing with the hot exhaust gases 36. The resulting hot pocket of engine gases elevated the temperature of the engine shroud to the sides and aft of the bypass relief door 12 and cutout 26.

Figure 10:
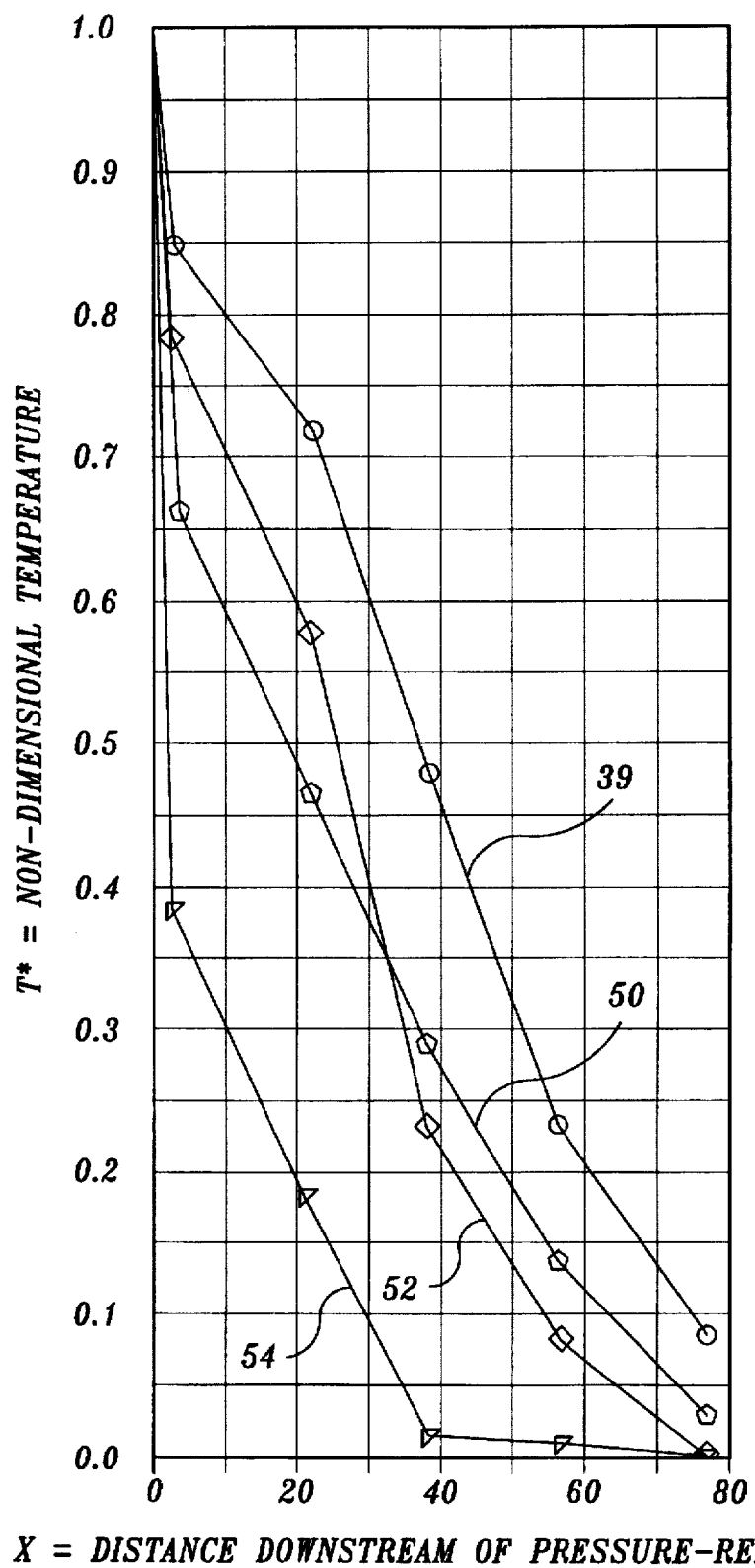
FIG. 10 is a graph of temperature versus distance downstream of the pressure relief door.

In order to evaluate the effect of the hot engine gases 36 on the structure of the engine shroud 16, a ducted fan jet engine scale model was used to obtain experimental air impingement temperature profiles aft of the pressure relief door 12. The resulting data are shown in FIG. 10. FIG. 10 is a graph of the nondimensionalized temperature of air impinging on the surface of the engine shroud aft of the pressure relief door for various pressure relief door 12 and cutout 26 configurations. Nondimensionalized temperature T is plotted along the y-axis while the distance downstream of the pressure relief door 12 is plotted along the x-axis inches. Data line 39 in FIG. 10 illustrates the downstream engine shroud temperature for a rectangular cutout 26 and rectangular pressure relief door 12, commonly used in ducted fan turbine engines. As seen in FIG. 10, the temperature of the engine shroud directly aft of the pressure relief door is 85 percent of the temperature of the escaping hot engine gases 36.

During a bleed duct failure, the exiting engine gases can reach temperatures of 1,000°–1500° F. It is easy to understand why prior art engine shrouds incorporating aluminum structures capable of withstanding temperatures of no more than 500° F. must include insulating blankets. As illustrated by data line 39, the temperature of the surface of the engine shroud after the pressure relief door rapidly decreases. However, the temperature does not reach 50 percent of the temperature of the exiting gases until approximately 38 inches aft of the aft edge of the door.

Under Federal regulations, FAR 25.1103, the structure 16 must safely withstand the effects of a bleed duct or other engine failure. The elevated temperatures produced on the structure by the hot gases 36 during a bleed duct failure are unacceptable for aluminum structures. The present invention reduces the temperatures of the engine shroud 16 aft of the pressure relief door 12 and cutout 26 by altering the flow of hot engine gases 36 out of the cutout 26. The reduction mechanism eliminates the need to include insulating blankets or form shrouds of high temperature materials, such as titanium. FIGS. 4–8 illustrate five different embodiments of pressure relief door 12 and cutout 26 configurations formed in accordance with the present invention.

In each of the embodiments of the invention illustrated in FIGS. 4–8, the pressure relief door 12 and cutouts 26 are identified with the same reference numerals. In each embodiment, the pressure relief door 12 is pivotally attached to the engine shroud 16 along its forward edge 30. Each pressure relief door 12 is also releasably attached to the engine shroud 16 along its aft edge with a latch mechanism (not shown) in a manner well known in the art. The latch mechanism is designed to release at a predetermined pressure thus allowing the aft edge of the door to pivot open and the engine gases 36 to exit out the cutout 26, and past the pressure relief door 12. The differences between each of the embodiments of the invention and the resulting effects on structural temperatures aft of the pressure relief door are described below.

Figure 4A:
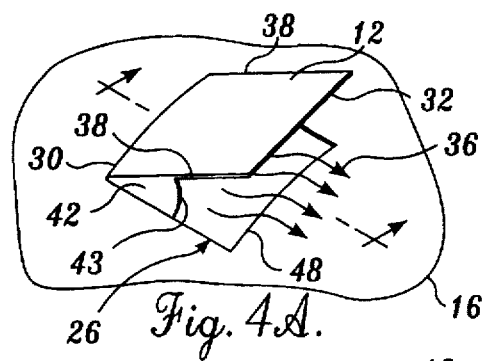
FIGS. 4A and B are a perspective view and a cross section view, respectively, of a pressure relief door according to the present invention.
Figure 4B:
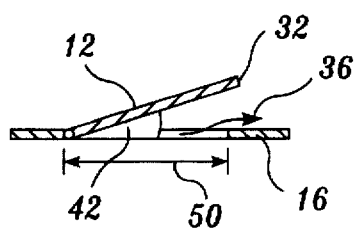

In the first embodiment illustrated in FIGS. 4A and B, both the door 12 and cutout 26 are rectangular and the door is sized to fit within a similarly shaped cutout when it is closed. As illustrated in FIGS. 4A and B, one method of altering the flow of hot engine gases 36 out of the pressure relief door 12 and cutout 26 is to place a wall or fence 42 on opposing sides 38 of the pressure relief door 12. Each fence 42 extends inward, approximately perpendicular to the surface of the door 12 into the cutout 26. The fences 42 are configured to prevent the flow of hot engine gases 36 out the sides 38 of the cutout 26 and pressure relief doors 12. In the first embodiment, the trailing edge 43 of each fence is preferably rounded to allow the fence to clear internal engine components (not shown).

The fences 42 redirect the flow of hot engine gases 36 rearward so that a larger volume of engine gases exit out the rear edge 48 of the cutout 26 as opposed to exiting out from under the sides 38 of the pressure relief door 12. The fences 42 illustrated in the first embodiment of FIGS. 4A and 4B extend from the upstream edge 30 downstream over approximately one-half the length 50 of the cutout 26.

The door 12 and cutout 26 of the first embodiment was tested on the test model in a manner similar to that used to test the rectangular door and cutout from which the data for data line 39 was obtained (FIG. 10). The temperature data produced using the door 12 and cutout 26 of the first embodiment is illustrated by data line 50 in FIG. 10. As shown by data line 50, the resulting air impingement temperatures produced on the surface of the engine shroud aft of the door are significantly lower than the temperatures shown by data line 39 for a similarly sized rectangular door 12 and cutout 26 without fences 42.

Although the first embodiment illustrated in FIGS. 4A and B uses fences 42 that extend over approximately half the length of the cutout 26, fences of other lengths could also be used. It has been found that fences 42 extending at least half the length of the cutout 26 achieve the most desirable results.

Figure 5A:
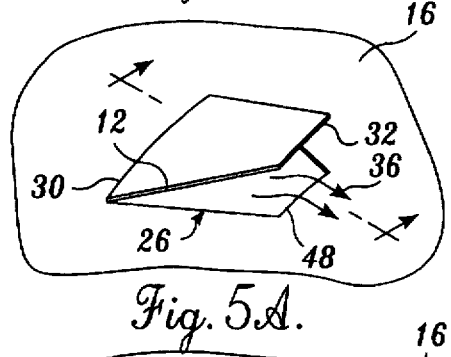
FIGS. 5A and B are a perspective view and a cross section view, respectively, of another embodiment of a pressure relief door according to the present invention.
Figure 5B:
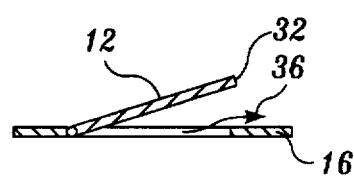

A second embodiment of the invention is illustrated in FIGS. 5A and B. In the second embodiment, no fences 42 are used. Instead, the pressure relief door 12 and cutout 26 are trapezoidal shaped having the forward edge 30 of the door and cutout wider than the aft edges 32 and 48. In the preferred configuration of the second embodiment, the aft edges 32 and 48 are approximately 80% as wide as the forward edges 30. Pressure relief doors 12 and cutouts 26 of alternate embodiments of the invention could have other proportions. In the second embodiment, it is important that the aft edge 48 of the cutout 26 be narrower than the forward edge of the cutout. Alternate embodiments of doors 12 and cutouts 26 of the invention could also include nonlinear sides such as convex or concave sides. As will be understood from the discussion below, it is not as important that the aft edge 32 of the door be narrower than the forward edge of the door.

The door 12 and cutout 26 of the second embodiment were tested on the test model in a similar manner to that used to test the rectangular door and cutout in the first embodiment. The resulting temperature data is shown by data line 52 in FIG. 10. Data line 52 shows a marked decrease in air impingement temperatures aft of the pressure relief door 12 and cutout 26 over the similarly sized rectangular door and cutout used to obtain data line 39.

Figure 9:
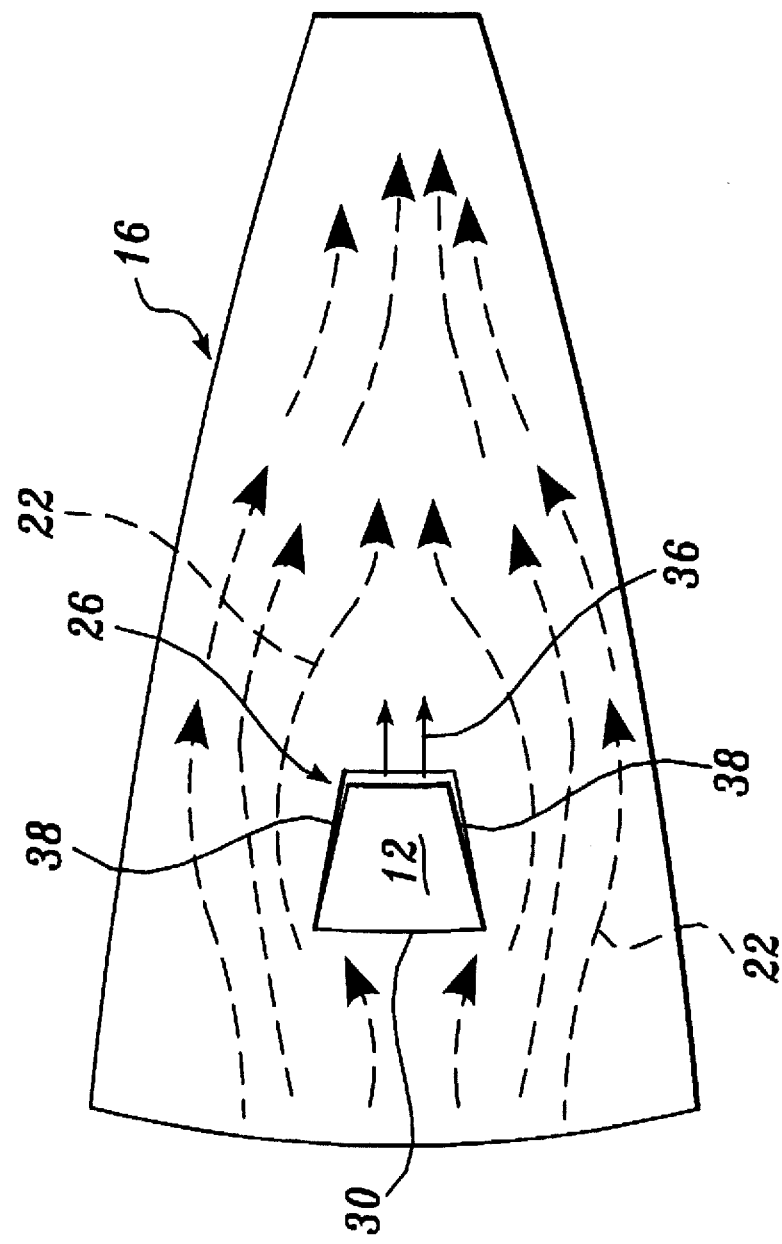
FIG. 9 is a schematic view of the air flow over the portion of the engine shroud surrounding the pressure relief door of FIGS. 5A and B.

As illustrated schematically in FIG. 9, the use of a trapezoidal pressure relief door 12 and trapezoidal cutout 26 allows the cool bypass air flow 22 to flow closer to the sides 38 of the pressure relief door than the rectangular door illustrated in FIG. 3. The altered air flow produced by the trapezoidal configuration allows the cool bypass air flow 22 to mix more effectively with the hot engine gases 36 exiting through the cutout 26. The result is that the hot engine gases 36 do not remain in contact with the engine shroud 16 for as long as they do when similarly sized rectangular doors and cutouts are used without fences. The engine gases 36 decreased contact with the engine shroud 16 lowers the resulting temperatures on the surface of the engine shroud aft of the pressure relief door 12.

Figure 6A:
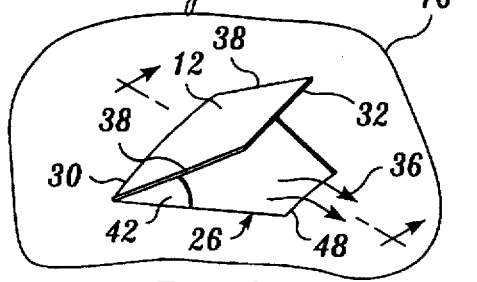
FIGS. 6A and B are a perspective view and a cross section view, respectively, of yet a further embodiment of a pressure relief door according to the present invention.
Figure 6B:
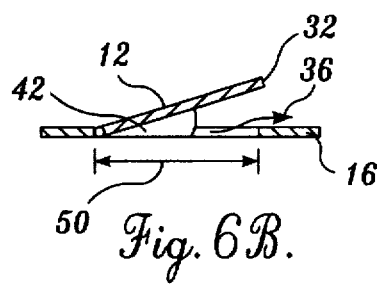

A third embodiment of a pressure relief door 12 and cutout 26 according to the present invention is illustrated in FIGS. 6A and B. The third embodiment is similar to the second embodiment illustrated in FIGS. 5A and B, but includes opposing side fences 42. In a manner similar to that described with respect to the first embodiment of FIGS. 4A and B, the side fences 42 extend inward approximately perpendicular to the surface of the door 12 into the cutout 26. The fences 42 also extend aft from the forward edge 30 over approximately one-half the length 50 of the cutout 26. In alternate embodiments, the length of the fences 42 could be longer or shorter. However, the most advantageous results are achieved when the fences extend at least over half of the length 50.

The third embodiment illustrated in FIGS. 6A and B, including a trapezoidal cutout and half length fences 42 was also tested on the test model. The resulting temperature data is shown by data line 54 in FIG. 10. As seen from data line 54, the combination of the trapezoidal cutout 26 and door 12 and half length fences 42 produced the most advantageous results of the embodiments tested. As illustrated by data line 54, the combination of trapezoidal cutout 26 and door 12 and half length fences 42 produced the lowest air impingement temperatures aft of the pressure relief door.

Figure 7A:
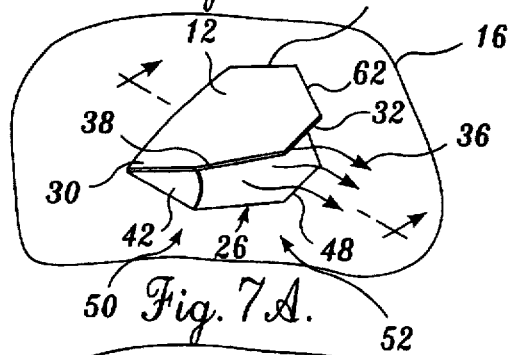
FIGS. 7A and B are a perspective view and cross section view, respectively, of yet another embodiment of a pressure relief door according to the present invention.
Figure 7B:
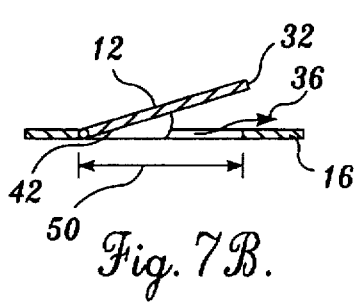

FIG. 7 illustrates a fourth embodiment of a pressure relief door 12 and cutout 26 according to the present invention. In the fourth embodiment, the upstream portion 60 of the pressure relief door 12 is rectangular while the downstream portion 62 of the door is trapezoidal. Fences 42 are located on the opposing sides 38 of the rectangular portion 60 of the door. Similarly, the upstream portion 50 of the cutout is rectangular and the downstream portion 52 of the cutout is trapezoidal so that the door 12 fits within the cutout 26 when closed. The fences 42 extend downward approximately normal to the surface of the door 12 into the cutout 26. The fences 42 of the fourth embodiment function in a manner similar to that described with respect to the first and third embodiments of the invention illustrated in FIGS. 4A and B and FIGS. 6A and B, respectively. The trapezoidal portions 52 and 62 of the cutout 26 and pressure relief door 12 also function in a manner similar to the trapezoidal door and cutout of the second embodiment of the invention illustrated in FIGS. 5A and B.

Figure 8A:
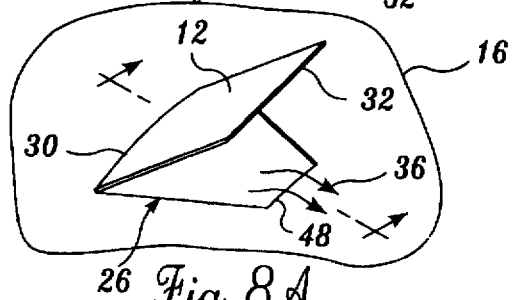
FIGS. 8A and B are a perspective view and cross section view, respectively, of still yet another embodiment of a pressure relief door according to the present invention.
Figure 8B:
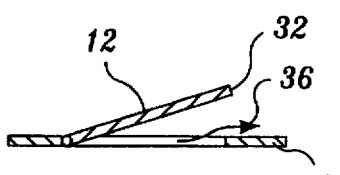

FIG. 8 illustrates a fifth embodiment of a pressure relief door 12 and cutout 26 according to the present invention. In the fifth embodiment, the cutout 26 is trapezoidal, while the door 12 is rectangular. The forward edge 30 of the door 12 and cutout 26 are approximately the same width. However, the aft edge 48 of the cutout is narrower than the aft edge 32 of the door 12. Thus, aft edge 32 of the door 12 overlaps the aft edge of the cutout 26 when closed as illustrated in phantom in FIG. 8. The trapezoidal cutout 26 of the fifth embodiment in FIG. 8. The trapezoidal cutout 26 of the fifth embodiment functions in a manner similar to the trapezoidal cutout of the second embodiment illustrated in FIGS. 5A and B. The trapezoidal cutout 26 of the fifth embodiment helps to create mixing of the cool bypass air flow 22 with the hot exhaust gases 36 exiting the cutout 26 even though the door 12 is rectangular.

Although the preferred embodiment of the invention has been illustrated as pressure relief doors 12 and cutouts 26 on the engine shroud pressure relief, doors and cutouts according to the present invention could be used at other locations on the engine assembly 10. For example, pressure relief doors and cutouts according to the present invention could be used as engine strut doors 50 (FIG. 1), nacelle doors 52 and 54, or pressure relief doors on auxiliary power units.

In addition to the trapezoid-shaped pressure relief doors, and cutouts, or fences described above, an alternate embodiment of the invention could use flow separators on the downstream edge of the cutout to enhance or in some situations possibly replace the trapezoidal cutouts and/or fences of the present invention. In such embodiments of the invention, a flow separator is placed along the downstream edge of the cutout to cause the gases 36 flowing out of the cutout to separate from the surface of the shroud or other structure 16. Separating the flow as it moves over the downstream edge of the cutout helps the flow of hot engine gases to mix with freestream or bypass air, depending upon the application. In accordance with the present invention, flow separators such as sharp edges on the downstream edge of the cutout, or fences that extend outward from the edge of the cutout could be used. Such flow separators trip the air flow into turbulent flow so that it separates from the surface of the structure downstream of the cutout and meets with the surrounding air flow.

While preferred embodiments of the invention have been illustrated and described, it will be appreciated that various changes can be made therein without departing from the spirit and scope of the invention. In addition, although the present invention has been illustrated with respect to use on a ducted fan turbine engine mounted under a wing, it may also be used on ducted fan engines mounted to the fuselage. Similarly, the present invention can also be used on turbo prop turbine engine installations that do not include an engine nacelle.

The embodiments of the invention in which an exclusive property or privilege is claimed are defined as follows:

1. A pressure relief system for an engine shroud of a turbine engine, comprising:
    a cutout in the engine shroud through which gases from the engine may escape the engine shroud in the occurrence of a bleed duct failure, the forward edge of the cutout being wider than the aft edge of the cutout; and
    a door pivotally coupled to the engine shroud at a forward edge and being movable from an open position in which gases may flow through the cutout to a closed position in which the door obstructs gases from flowing through the cutout.

2. The pressure relief of claim 1, wherein the door includes a wall located on the opposing sides of the door and extending inward at least partially into the cutout, the wall extending at least partially from the forward edge of the door to the aft edge of the door.

3. The pressure relief system of claim 2, wherein the wall extends approximately halfway from the forward edge of the door to the aft edge of the door.

4. The pressure relief system of claim 2, wherein the width of the forward edge of the door is greater than the width of the aft edge of the door.

* * * * *

UNITED STATES PATENT AND TRADEMARK OFFICE
CERTIFICATE OF CORRECTION

PATENT NO. : 5,704,207
DATED : January 6, 1998
INVENTOR(S) : D.T. Jensen et al.

It is certified that error appears in the above-indentified patent and that said Letters Patent is hereby corrected as shown below:

| COLUMN | LINE | |
|---|---|---|
| [75]<br>Pg. 1, col. 1 | Inventors | After "Bothell" delete ", both of Wash." and insert therefor --; Michael L. Sangwin, Kirkland, all of Wash.-- |
| [57]<br>Pg. 1, col. 2 | Abstract<br>line 4 of text | "onward" should read --outward-- |

Signed and Sealed this

Thirty-first Day of March, 1998

Attest:

BRUCE LEHMAN

Attesting Officer

Commissioner of Patents and Trademarks